United States Patent

[11] 3,599,721

| [72] | Inventor | William L. Livingston<br>Sharon, Mass. |
|---|---|---|
| [21] | Appl. No. | 848,987 |
| [22] | Filed | Aug. 11, 1969 |
| [45] | Patented | Aug. 17, 1971 |
| [73] | Assignee | Factory Mutual Research Corporation |

[54] FLUID CONTROL SYSTEM
14 Claims, 2 Drawing Figs.

[52] U.S. Cl. .................................................. 169/8
[51] Int. Cl. .................................................. A62c 35/00
[50] Field of Search ............................................. 169/5, 6, 7,
8, 17; 138/26, 206, 209; 23/282; 48/4, 5, 6, 8, 13,
61; 137/202

[56] References Cited
UNITED STATES PATENTS

| 637,546 | 11/1899 | Bennett | 48/4 |
| 638,897 | 12/1899 | Watt | 48/4 |
| 653,255 | 7/1900 | Loetzer | 137/202 |
| 655,300 | 8/1900 | Einstein | 48/4 |
| 657,896 | 9/1900 | Rowe | 137/202 |
| 1,000,403 | 8/1911 | Hansen | 48/4 |
| 1,410,393 | 3/1922 | Ernest | 23/282 |
| 1,810,672 | 6/1931 | Minrath | 23/282 |
| 2,337,959 | 12/1943 | Anderson | 138/26 |
| 2,204,788 | 6/1940 | Borden | 137/202 |
| 1,270,135 | 6/1918 | Enright | 169/8 |

Primary Examiner—M. Henson Wood
Assistant Examiner—Edwin D. Grant
Attorney—Lane, Aitken, Dunner & Ziems ABSTRACT: A fluid control system in which a predetermined level of fluid is maintained in a conduit by varying the pressure in the conduit in response to variations in the fluid level. When the fluid level exceeds the predetermined level a powder disposed in a fluid flow relationship with the conduit is wetted by the fluid to produce a gas which causes the pressure in the conduit to exceed the pressure of the fluid, and thus reduce the level of the fluid to the predetermined level. When the fluid level drops below a predetermined level as a result of an increased pressure in the conduit, the conduit is vented to atmosphere to reduce the pressure and raise the fluid level.

PATENTED AUG 17 1971
3,599,721
FIG.I.
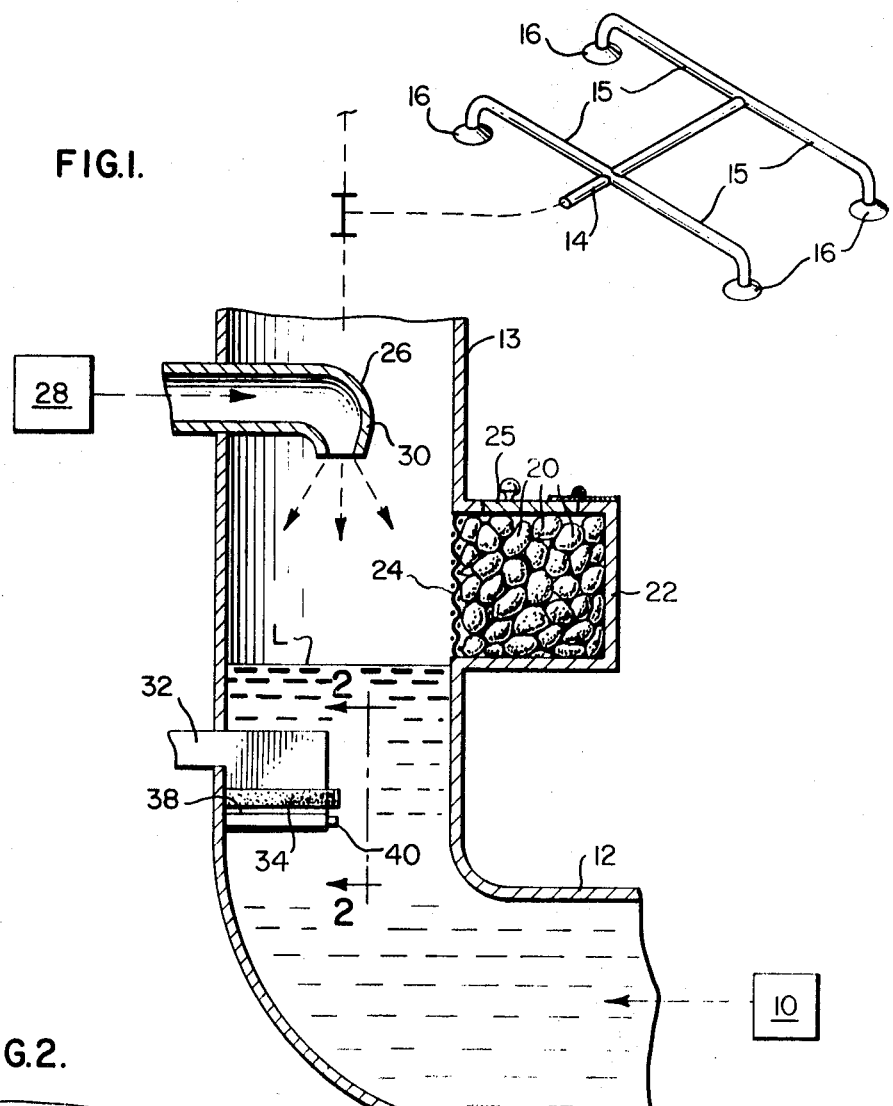
FIG.2.
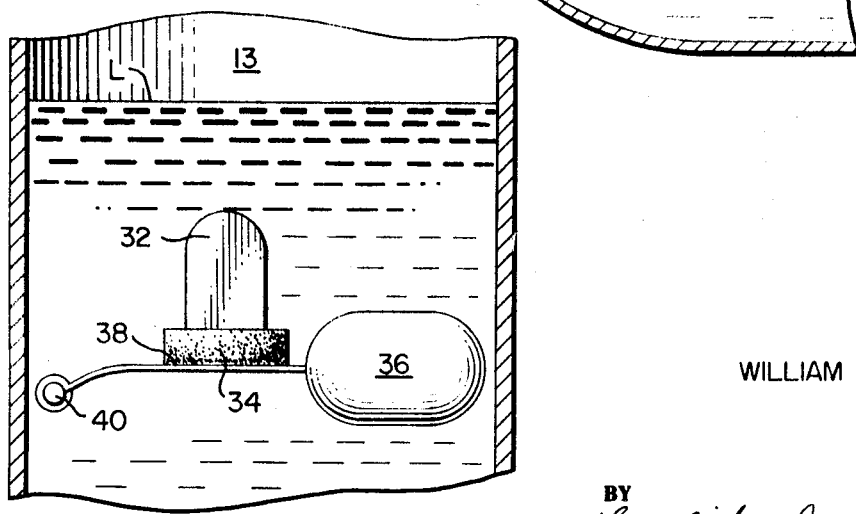
INVENTOR
WILLIAM L. LIVINGSTON
BY
Lane, Aitken, Dunner + Ziems
ATTORNEYS

3,599,721

FLUID CONTROL SYSTEM

BACKGROUND OF THE INVENTION

This invention relates to a fluid control system and, more particularly, it concerns a novel arrangement for maintaining a portion of a fluid flow system "dry" despite variations in the pressure of fluid in the main fluid supply portion of the system. Although the invention has particular utility in certain types of fire extinguishing systems to be described, it is understood that other applications are contemplated.

There are presently in use various types of fluid flow systems in which a portion of the system is normally kept in a dry condition in contradistinction to another portion filled with liquid. A great majority of these systems utilize a valve or other mechanical device in the connecting the wet and dry portions. For example, in a fire-extinguishing system utilizing automatic sprinklers, a one-way valve is normally interposed between the main supply of water, or other fire extinguishant, and conduits leading to sprinkler heads in order to keep these latter conduits dry so that they will not freeze in the event the ambient temperature drops below the freezing point of the extinguishant. However, the use of this type valve arrangement is cumbersome and sometimes hazardous in the context of the intended function of fire extinguishing systems. For example, when the pressure of the extinguishant exceeds the design limits of the valve, as often happens, it is likely that some extinguishant will seep through to the dry portion of the system and will be unable to return through the valve, thus wetting the dry portion of the system and requiring an extensive evacuation to return that portion to a dry condition.

The hazardous aspect of such valve arrangement is perhaps in good measure a product of the cumbersome aspects of the use as above mentioned. In this sense it might be borne in mind that a maintenance engineer or other person charged with the responsibility of maintaining a building in proper condition is likely to seek short cuts to the solution of problems with which he is presented, often without regard to the long term consequences thereof. It has been found, for example, that one of the principal causes of failure or malfunction in fixed fire-extinguishing systems of the type referred to above is that the mechanical valve structure is jimmied to hold it in an absolutely closed position. Such valves have been known to be welded closed, wedged closed or otherwise prevented from opening. The obvious reason for this condition, as contrary as it is to the intended function of the fire extinguishing system, is that it provides an immediate solution to a maintenance engineer's problem in the repair of a leak or other time-consuming task in providing needed repairs to the fire extinguishing system itself. The results of such activities are obvious; that is, when a fire occurs within the building space protected, no water or other extinguishant is available to put it out. Moreover, the fire damage resulting is likely to be greater than it would without a fire extinguishing system simply because the protection intended to be provided by the system is taken care of in other ways when the system is not installed and ostensibly in use.

SUMMARY OF THE INVENTION

In accordance with the present invention, the liquid level in one or more conduits of a flow system is controlled by means of a pressure balance maintained by a chemical in powder form which when wetted will generate gas. The powder is placed in a fluid communication with the conduit connecting the wet and dry portions of the system so that when the level of the liquid in the conduit exceeds a predetermined level in response to pressure increases of the liquid in the wet or liquid supply portion of the system, the liquid will wet the powder and produce a gas in the dry portion of the conduit, causing the pressure in the latter to exceed the liquid pressure and reduce the level of the liquid in the conduit to the predetermined level. In the event the pressure in the dry portion of the conduit reaches a magnitude that causes the liquid level to drop below a predetermined level, means are provided to vent the conduit to atmosphere to reduce the pressure and raise the liquid level accordingly.

It is therefore an object of the present invention to provide a fluid control system which does not use a complex valve arrangement, yet achieves a self-regulating control of the fluid level in one or more conduits. Other objects and further scope of applicability of the present invention will become apparent from the detailed description to follow, taken in conjunction with the accompanying drawings.

BRIEF DESCRIPTION OF THE DRAWINGS

FIG. 1 is a schematic view of a flow system utilized in a fire extinguishing system, and illustrating in cross section the operative elements of the control system; and FIG. 2 is a cross section taken along the lines 2–2 of FIG. 1.

DESCRIPTION OF THE PREFERRED EMBODIMENT

As shown in FIG. 1 of the drawings, the water supply source 10 is connected by a main 12 to a riser 13 forming part of a dry fire extinguishing system to which this invention is particularly suited for use. Although the system as shown is suited for the use of water by itself as the fire extinguishant, other recently developed and more effective extinguishants may be used. For example, ablative fluids formed by introducing a swellable polymer powder gell to be mixed with the water in either the main 12 or the riser 13 may be used in a manner disclosed in a copending application entitled "Method of Controlling Fire," Ser. No. 766,475, filed Oct. 10, 1968 by the inventors William L. Livingston and Russel W. Pierce, and assigned to the assignee of the present invention. A further disclosure of such systems is disclosed in a copending application entitled "Dynamic Flow Sensor," Ser. No. 768,862, filed by William L. Livingston and also assigned to the assignee of the present invention.

In accordance with conventional practice, the main 12 connects with the riser 13 at the lower floor level of a building in which the fire extinguishing system is installed. The riser therefore, extends upwardly to the respective floors of the building to be protected, each floor including a submain 14 to which lateral branches 15 are connected to feed extinguishant to sprinklers 16. The sprinkler heads 16 are also of a conventional type and as such, are adapted to release or open automatically in response to ambient temperatures existing under the conditions of a fire.

In dry fire-extinguishing systems of the type with which the present invention is particularly suited for use, that portion of the system including the riser 13, the submains 14, the branch lines 15 and the sprinkler heads 16 are normally maintained dry. That is, under all conditions except those existing during a fire, when extinguishant is called for by activation of any one or more of the sprinkler heads 16, the liquid extinguishant such as water is kept from that portion and preferably below a level designated by the reference letter L in FIG. 1 of the drawings. The principal advantage of such dry systems is that they can be used in buildings where ambient temperatures may drop below freezing. Another important advantage, however, is that because the system within the building is dry or free of water, a supervisory air pressure in the dry portion of the system may be used to detect leaks in the system without subjecting the contents of the building or space protected to water damage.

Inasmuch as the dry portion of the system is pressurized by air or other suitable gas in accordance with conventional practice, one might query the need for the elaborate mechanical valves which have been used in the past, since obviously, the system used to pressurize the dry portion could include a regulator sensitive to variations of pressure in the gas and the gas, itself used to maintain the appropriate water level. The pressure variations of gas in the dry portion of the system however, do not account for pressure variations in the supply of water from the source 10 through the main 12. Hence, valves have been used to restrict mechanically the level of liquid in the riser 13 and eliminate the effects of water pressure variation from the control parameters of the pneumatic system.

In accordance with the present invention, the need for such valves or the like is eliminated by means capable of generating gas at pressures above the highest anticipated water pressure, such means including sodium bicarbonate or other suitable chemicals which release the gas when wetted. To this end in the disclosed embodiment, the reactant chemical, preferably powder in the form of a plurality of capsules or tablets 20, is placed in an auxiliary chamber 22 located at the lower end of the dry portion of the system or above the level L and open to the interior of the riser 13 through a screen 24. A hinged trap door 25 may be provided on the chamber 22 to facilitate loading the chamber.

It will be appreciated that the original or initial pressure of the dry portion of the system can be achieved by suitable means. In the embodiment disclosed, a conduit 26 extending through the side of the riser 13 to an air compressor or other external source of compressed gas and provided with a nozzle 30 on its inner end may be operated to achieve the desired initial or base pressure in the dry system. This pressure is adjusted so that it balances the water pressure in the main 12 so that the water from the supply 10 is maintained at the level designated by the reference letter L.

With the above arrangement, in the event the extinguishant rises in the riser 13 due to an increase in the pressure of the extinguishant in the main conduit 12, which pressure exceeds the initial pressure established in the riser by the compressed air, the extinguishant will flow into the chamber 22 thereby wetting the powder and generating a gas. This gas will pass through the screen 24 and into the dry portion of the riser 13, and thus will increase the pressure in the latter until it exceeds that of the extinguishant. This increased pressure will force the extinguishant level back below the level of the floor of the chamber, or to the general vicinity of the line L in FIG. 1.

In order to prevent the level of the extinguishant from becoming too low in response to too great a pressure accumulating in the dry portion of the riser 13, a vent pipe 32 may be provided which communicates with the riser 13 by means of a float valve shown more clearly in FIG. 2. In particular, a portion of the vent pipe 32 extends into the riser 13 and is enlarged to form a flat bottom which is slotted and has a rectangular gasket 34 extending around the slot. A float ball 36 is provided in the riser and is attached to one end of an arm 38 which pivots about a shaft 40 fixed to the wall of the riser to permit the float ball to oscillate in response to fluctuations of the extinguishant level in its vicinity. In the uppermost portion of the float ball 36 as shown in FIG. 2, a portion of the arm 38 is adapted to engage the gasket 34 to close off the vent pipe. If the extinguishant level falls below this uppermost position of the float ball 36, the latter will move downwardly and thus open the slotted portion of the vent pipe. This enables the pressurized gas and air in the upper portion of the riser to escape, thereby permitting the extinguishant level to rise accordingly.

Of course, when the sprinkler heads 16 open up as a result of a fire condition, the pressure in the dry portion of the system is relieved and the extinguishant surges outward through the branch conduits 15 and the heads 16. At this time any resultant intermixing of the extinguishant and powder will be of no consequence.

Thus, the present invention eliminates a complex valve arrangement while achieving a self-regulating control of the liquid level in the conduit. Moreover, the function served by the present invention is effected without placing any mechanical barrier whatsoever in the main supply line of extinguishant to the sprinkler heads in the fire extinguishing system. On the contrary, the present invention not only avoids such a barrier but makes it very difficult for one to provide such a barrier particularly without it being detected by an inspector, because of the absence of plumbing hardware to this end.

It is emphasized that variations of the above structure and arrangement can be made without departing from the scope of the invention. For example, the invention is not limited to fluid flow conduits but extends to other fluid storage systems such as fluid containers, etc. Also, the design of the system and the type and size of powder may be such that the need for the source of compressed air in the riser is eliminated. Further, the uppermost, sealing position of the float ball can be varied in accordance with the minimum level of the extinguishant desired in the riser.

Also, other variations of the specific construction and arrangement of the fluid control system disclosed above can be made by those skilled in the art without departing from the invention as defined in the appended claims.

I claim:

1. In a fire-extinguishing system in which an extinguishant normally carried in a main conduit is supplied by a riser to a sprinkler head located in a branch conduit extending from said riser, apparatus for maintaining at least a portion of said riser and said branch conduit free from said extinguishant in the absence of fire, said apparatus comprising means for regulating the pressure in said portion of said riser in response to variations in the level of extinguishant in said riser to control said extinguishant level.

2. The apparatus of claim 1 wherein said means for regulating the pressure in said portion of said riser comprises means for producing a gas in said portion in response to increases in the level of said extinguishant, the pressure of said gas causing the pressure in said portion to exceed the pressure of said extinguishant.

3. The apparatus of claim 2 wherein said gas producing means is in the form of a powder in a flow relationship with said portion of said riser, and adapted to produce a gas when wetted by said extinguishant, and wherein said extinguishant flows into contact with said powder in response to the level of said extinguishant exceeding a predetermined level.

4. The system of claim 2 wherein said means for regulating the pressure in said portion of said riser further comprises means for venting said riser in response to decreases in the level of said extinguishant.

5. The system of claim 1 wherein said means for regulating the pressure in said portion of said riser comprises means for venting said riser in response to decreases in the level of said extinguishant.

6. The system of claim 5 wherein said means for venting said riser comprises a float operated valve adapted to connect said riser with the atmosphere.

7. The apparatus of claim 1 further comprising means for introducing compressed air into said portion of said riser to establish an initial pressure therein.

8. A fluid flow and storage system comprising a flow conduit for a pressurized liquid, a portion of said conduit containing gas and normally being free of said liquid, said conduit being normally closed but being adapted to open and permit the escape of said gas and the flow of liquid therethrough, and means for regulating the pressure of said gas in said portion of said conduit in its closed condition in response to variations in the level of liquid therein to control said liquid level.

9. The system of claim 8 wherein said means for regulating the gas pressure in said portion of said conduit comprises means for producing additional gas in said portion in response to increases in the level of said liquid, the pressure of said additional gas causing the pressure in said portion to exceed the pressure of said liquid.

10. The system of claim 9 further comprising a storage chamber communicating with said portion of said conduit, and wherein said gas producing means is in the form of a powder disposed in said chamber and adapted to be wetted by said liquid and produce a gas, and wherein said liquid flows into contact with said powder in response to the level of said liquid exceeding a predetermined level.

11. The system of claim 9 wherein said means for regulating the pressure in said portion of said conduit further comprises means for venting said portion in response to decreases in the level of said liquid.

12. The system of claim 8 wherein said means for regulating the pressure in said portion of said conduit portion comprises means for venting said portion in response to decreases in the level of said liquid.

13. The system of claim 12 wherein said means for venting said portion comprises a float operated valve adapted to connect said portion of said conduit with the atmosphere.

14. The system of claim 8 further comprising means for introducing compressed gas into said portion of said conduit to establish an initial pressure therein.